United States Patent [19]

Beller et al.

[11] Patent Number: 4,526,041

[45] Date of Patent: Jul. 2, 1985

[54] DIGITAL FLUID FLOW RATE SENSOR

[75] Inventors: Wilbert E. Beller, Park Ridge; Edward J. Mateja, Hillside, both of Ill.

[73] Assignee: The Singer Company, Stamford, Conn.

[21] Appl. No.: 581,520

[22] Filed: Feb. 21, 1984

[51] Int. Cl.³ .............................................. G01F 1/38
[52] U.S. Cl. .................... 73/861.47; 73/702; 73/723
[58] Field of Search ........... 73/861.47, 861.48, 861.61, 73/861.63, 861.64, 702, 715, 723, 861

[56] References Cited

U.S. PATENT DOCUMENTS

| | | |
|---|---|---|
| 381,373 | 4/1888 | Herschel . |
| 1,298,471 | 3/1919 | Dodge .............................. 73/861.61 |
| 2,406,181 | 8/1946 | Wiegand . |
| 2,886,968 | 5/1959 | Johnson et al. . |
| 4,301,685 | 11/1981 | Guillemont .......................... 73/723 |

Primary Examiner—Herbert Goldstein
Attorney, Agent, or Firm—David L. Davis; Robert E. Smith; Edward L. Bell

[57] ABSTRACT

A flow rate sensor includes a diaphragm operated switch coupled to a Venturi in a flow conduit. The apparatus includes a housing having a diaphragm defining a chamber. The chamber has a first port connected to the Venturi and a second vent port. A valve connected between the first port and the diaphragm is spring loaded so that the first port is normally open. In the absence of fluid flow, the Venturi pressure is zero under the diaphragm and the diaphragm is at rest in an up position so that the valve is open. With fluid flow through the Venturi, vacuum will build under the diaphragm so that the diaphragm will travel down until the valve closes the first port. With the valve closed, pressure under the diaphragm will increase due to flow through the vent port and the diaphragm will move up. The valve will remain closed until the diaphragm up stroke is equal to the valve stem lost motion. The valve will then open and the process will cycle so that the diaphragm oscillates at a rate that bears a relationship to the square of the fluid flow rate through the Venturi. A sensor coupled to the diaphragm produces a pulsating digital signal, from which signal the flow rate may be calculated.

9 Claims, 5 Drawing Figures

DIGITAL FLUID FLOW RATE SENSOR

DESCRIPTION

BACKGROUND OF THE INVENTION

This invention relates to apparatus for measuring the rate of flow of a fluid through a conduit and, more particularly, to such apparatus which does not include any moving parts within the conduit.

There are many applications where it is desired to control the flow of a fluid through a conduit in order to fill a container with a desired amount of the fluid. For example, in an appliance such as a clothes washing machine, the user may select a desired water level depending upon the size of the load being washed. With the advent of microcomputer control of such appliances, many of the control functions previously handled by electromechanical devices have been taken over by the microcomputer. It would be desirable for the microcomputer to control the water level in such an appliance. It is therefore an object of the present invention to provide apparatus through which a microcomputer based system can control fluid levels.

Fluid level can be directly measured in a number of ways such as, for example, by providing a plurality of level sensors at different levels of the fluid container. However, it would be desirable to be able to take advantage of the computing power of the microcomputer. Fluid level may also be measured by knowing the rate at which fluid enters the container and then integrating this rate with respect to time. Thus, only a single sensor coupled between a conduit feeding the container and the microcomputer would be required. It is therefore a further object of this invention to provide a fluid flow rate sensor.

A microcomputer is digital in nature. If a sensor which is to provide an input to a microcomputer were to provide an analog output, then an analog to digital converter would be required, adding to the expense of the system. It is therefore still a further object of this invention to provide a fluid flow rate sensor which has a digital output.

Flow rate sensors are known which have moving parts, such as impellers or turbines, in the fluid flow path. Such moving parts result in a number of disadvantages, such as interfering with, and having an effect upon, the fluid flow. It is therefore another object of this invention to provide a digital fluid flow rate sensor having no moving parts in contact with the fluid flow media.

SUMMARY OF THE INVENTION

The foregoing and additional objects are attained in accordance with the principles of this invention by providing apparatus for providing a signal related to the rate of flow of a fluid through a conduit comprising means for providing a restriction in the conduit, a housing having a chamber formed therein, a diaphragm sealing the chamber, an open passageway through the housing between the chamber and the exterior of the housing, means for providing communication between the chamber and the conduit in the vicinity of the restriction, a valve seat supported on the housing at the entrance of the communication means into the chamber, a valve seat seal coupled to move with the diaphragm toward and away from sealing engagement with the valve seat, means for biasing the valve seat seal away from the valve seat, and switching means coupled to the diaphragm for providing the signal.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1A:
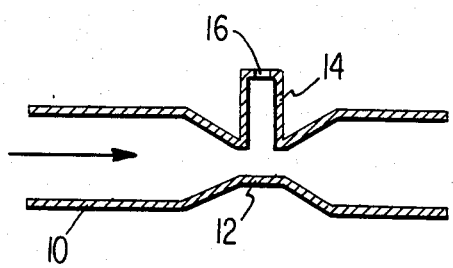
FIG. 1A depicts fluid flow through a conduit having a vented restriction.
Figure 1B:
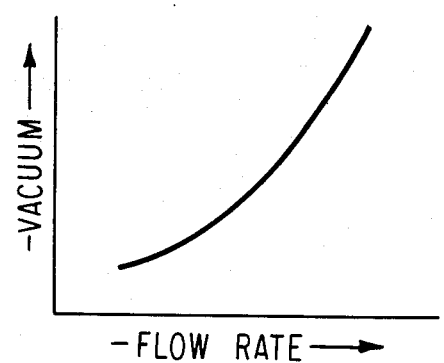
FIG. 1B is a graph showing the vacuum at the vent as a function of the fluid flow rate through the conduit.

Referring now to the drawings, FIG. 1 depicts fluid flow, in the direction shown by the arrow, through a conduit 10 having a restriction 12. In the vicinity of the restriction 12, there is a manifold 14 having an opening 16. The conduit depicted in FIG. 1A exhibits what is known as the Venturi effect whereby a pressure drop is created longitudinally along the restriction 12 so that a vacuum is in effect created at the opening 16. It has been found that the vacuum increases as a function of the square of the flow rate, as schematically depicted in FIG. 1B.

Figure 2:
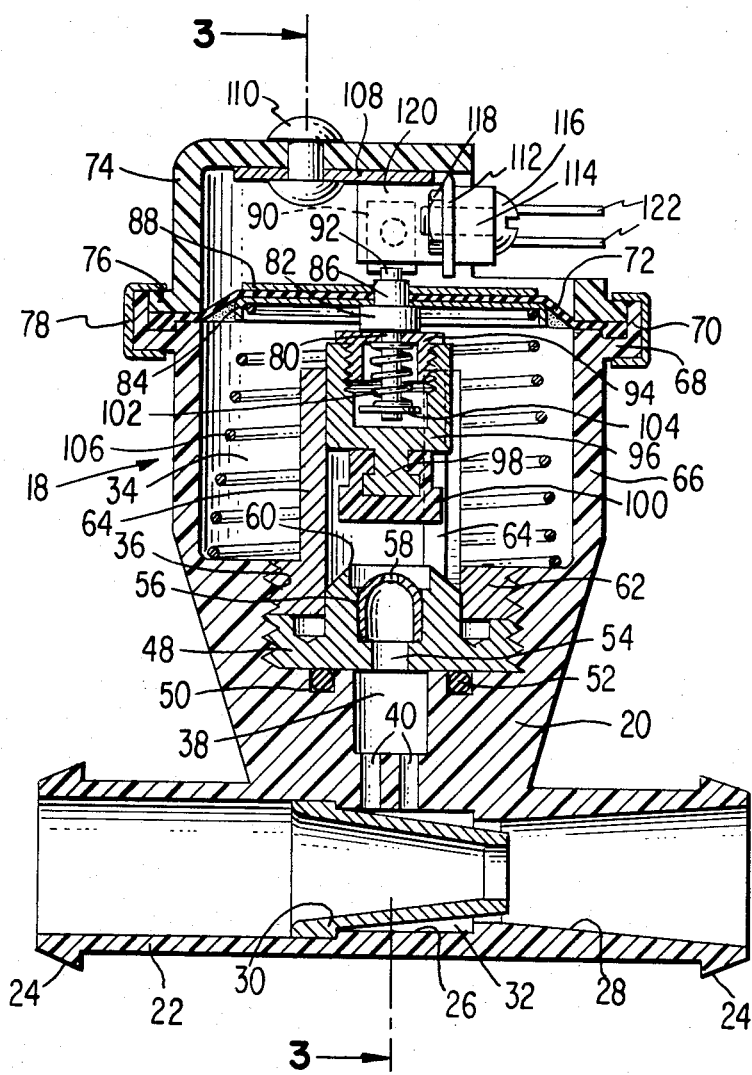
FIG. 2 is a longitudinal cross section of apparatus constructed in accordance with the principles of this invention, depicting the condition where the valve seat seal is away from the valve seat.
Figure 3:
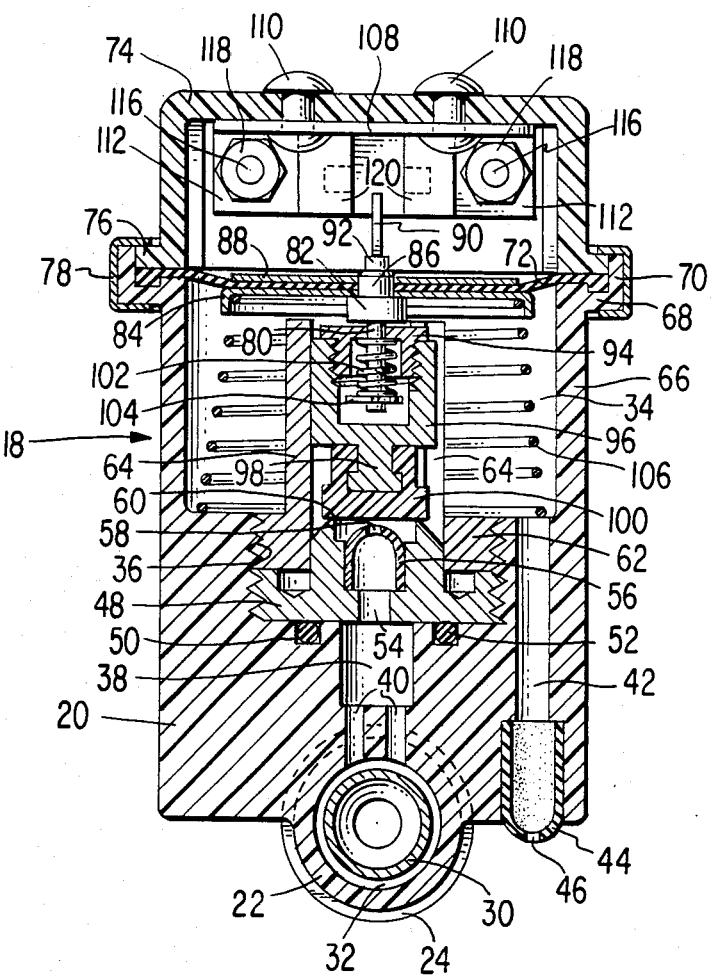
FIG. 3 is a cross section taken substantially along the line 3—3 in FIG. 2, depicting the condition where the valve seat seal is sealingly engaged with the valve seat.

FIGS. 2 and 3 show apparatus 18 for providing signals related to the vacuum, and accordingly related to the fluid flow rate. The apparatus includes a housing 20, preferably molded of a material such as glass filled nylon, which housing also includes a conduit portion 22 having tapered outwardly extending flanges 24 at both ends thereof, which flanges 24 are adapted to hold in place hoses into which the ends of the conduit portion 22 are inserted. The inside of the conduit portion 22 is so shaped, as with a first uniform step 26 and a second tapered step 28, that a tapered orifice member 30 may be snuggly press fit into place. The orifice member 30 forms a restriction to fluid flow through the conduit portion 22, the apparatus being designed for fluid flow from left to right, when viewed as in FIG. 2. Thus, with the orifice member 30 in place and fluid flowing from left to right, a pressure drop with respect to the pressure of the incoming fluid is created in the annular chamber 32 formed between the outside of the orifice member 30 and the inside of the conduit portion 22.

The housing 20 is formed with an interior chamber 34. The lower end of the chamber 34 is formed with a smaller interiorly threaded portion 36, at the lower end of which is a small chamber 38 which communicates with the annular chamber 32 through four relatively narrow passages 40. The housing 20 is also formed with an open passageway 42 therethrough which communicates between the chamber 34 and the ambient environment at the exterior of the apparatus 18. A ferrule 44 having an opening 46 closes the passageway 42. The size of the opening 46 determines the flow rate through the passageway 42.

A valve seat member 48 is threadedly secured in the threaded chamber portion 36. At the bottom end of the chamber portion 36, the housing 20 is formed with an annular groove 50 surrounding the small chamber 38, into which is inserted an O-ring 52 for sealing purposes. The valve seat member 48 is formed with a stepped passageway 54 which is capped by a ferrule 56 having an opening 58. Surrounding the stepped passageway 54, the valve seat member 48 is formed with a valve seat 60. Thus, there is provided communication between the chamber 34 and the conduit 22 in the vicinity of the restriction provided by the orifice member 30.

A guide member 62 is also threadedly secured within the portion 36 above the valve seat member 48. The guide member 62 illustratively has three guide fingers 64 equiangularly spaced and extending upward from the threaded portion of the guide member 62.

The upper end of the housing 20 is formed with an upstanding wall 66 surrounding the chamber 34. The top of the wall 66 is formed with an outwardly extending annular shoulder 68 which itself is surrounded by a relatively short upstanding wall 70. A diaphragm 72 seals the chamber 34 and has its outer periphery resting on the top of the wall 66 and the shoulder 68. A cap 74, formed with an outwardly extending flange 76, rests on the outer periphery of the diaphragm 72 inwardly of the wall 70 of the housing 20. A clamping ring 78 surrounds the wall 70. The clamping ring 70 is rolled so that it engages the lower surface of the shoulder 68, the top edge of the wall 70 and the upper surface of the flange 76 to secure the cap 74 to the housing 20 while putting a compressive load on the diaphragm 72, to complete the sealing of the chamber 34.

Connected to the diaphragm 72 for movement therewith is a plunger/valve seat seal assembly which extends into the guide channel defined by the guide fingers 64. The assembly includes an actuator rod 80 having an expanded portion 82 upon the upper shoulder of which rests a first diaphragm plate 84. The actuator rod 80 has a further portion 86 which extends through a central opening in the first diaphragm plate 84, a central opening in the diaphragm 72 and a central opening of a second diaphragm plate 88. The portion 86 is internally threaded and a flag 90 has a stem portion 92 thereof threadedly secured to the rod portion 86. The actuator rod 80 extends through a central opening in a retainer member 94. The retainer member 94 is slidable along the actuator rod 80. A plunger 96 having internal threads is threadedly secured to external threads on the retainer 94. At the lower end of the plunger 96, there is formed a downwardly extending foot 98 having an enlarged region over which is snapped a resilient valve seat seal 100. A spring 102 surrounds the lower end of the actuator rod 80. The extreme lower end of the actuator rod 80 is formed with an annular groove (not shown) into which is snapped a retaining ring 104, so that the spring 102 is held between the retaining ring 104 and the retainer member 94. There is thus provided a lost motion connection between the diaphragm 72 and the valve seat seal 100, as will be described hereinafter.

A spring 106 surrounds the guide member 62 and is held between the bottom of the chamber 34 and the lower surface of the first diaphragm plate 84 to bias the diaphragm 72 and valve seat seal 100 upwardly.

The electrical output signal from the apparatus 18 is generated by an optical interrupter assembly with which the flag 90 cooperates. This assembly includes a bracket 108 secured to the inside of the cap 74, illustratively by rivets 110. The bracket 108 has two perpendicularly extending legs 112 to which is secured a commercially available optical interrupter module 114, illustratively by means of bolts 116 and nuts 118. The module 114 includes a pair of spaced apart legs 120, one of which holds a light source and the other of which holds a light detector. The flag 90 moves between the legs 120 so that it interrupts the light path between the source of light and the detector when it is in its upper region of travel. Accordingly, an electrical signal is generated at the terminals 122.

The operation of the apparatus 18 will now be described. With no fluid flowing through the conduit 22, the pressure within the chamber 34 is atmospheric pressure because of the open passageway 42. Therefore, the spring 106 pushes the the diaphragm 72 upward to the position shown in FIG. 2. In this position, the valve seat seal 100 is spaced from the valve seat 60. Also at this time, the flag 90 interrupts the light path between the module legs 120. When fluid flows through the conduit 20 from left to right, as viewed in FIG. 2, due to the Venturi effect a pressure drop is created in the annular chamber 32. This pressure drop is communicated to the chamber 34 through the passages 40, the small chamber 38, the stepped passageway 54 and the ferrule opening 58. Accordingly, the pressure under the diaphragm 72 will be lower than the pressure over the diaphragm 72 and the diaphragm 72 will move downwardly against the force of the spring 106. As the diaphragm 72 moves down, this causes the actuator rod 80 to move down, pulling with it the retainer member 94, the plunger 96 and the valve seat seal 100. Travel in this manner continues until the valve seat seal 100 contacts the valve seat 60, closing off the chamber 34 from the annular chamber 32. This condition is depicted in FIG. 3, and as shown therein the flag 90 allows light to pass between the module legs 120.

With the valve formed by the seat 60 and the seat seal 100 closed, pressure in the chamber 34 under the diaphragm 72 will increase due to flow through the ferrule opening 46 and the open passageway 42 from the outside of the housing 20 into the chamber 34. Thus, the diaphragm 72 will start to travel up. At this time, the valve is held closed due to the pressure drop between the chamber 34 and the annular chamber 32. As the diaphragm 72 moves up, the valve remains closed until the diaphragm up stroke equals the lost motion of the actuator rod 80 between the upper surface of the retaining ring 104 and the bottom of the retainer member 94, or alternatively, when the force of the spring 102 overcomes the pressure drop across the valve seat. The apparatus 18 thus returns to the condition depicted in FIG. 2 and the aforedescribed operation is repeated. Accordingly, the diaphragm 72 oscillates in relationship to the vacuum created in the annular chamber 32, which is related to the square of the fluid flow rate through the conduit 22. This oscillation of the diaphragm 72 results in a signal pulse train at the terminals 122.

Figure 4:
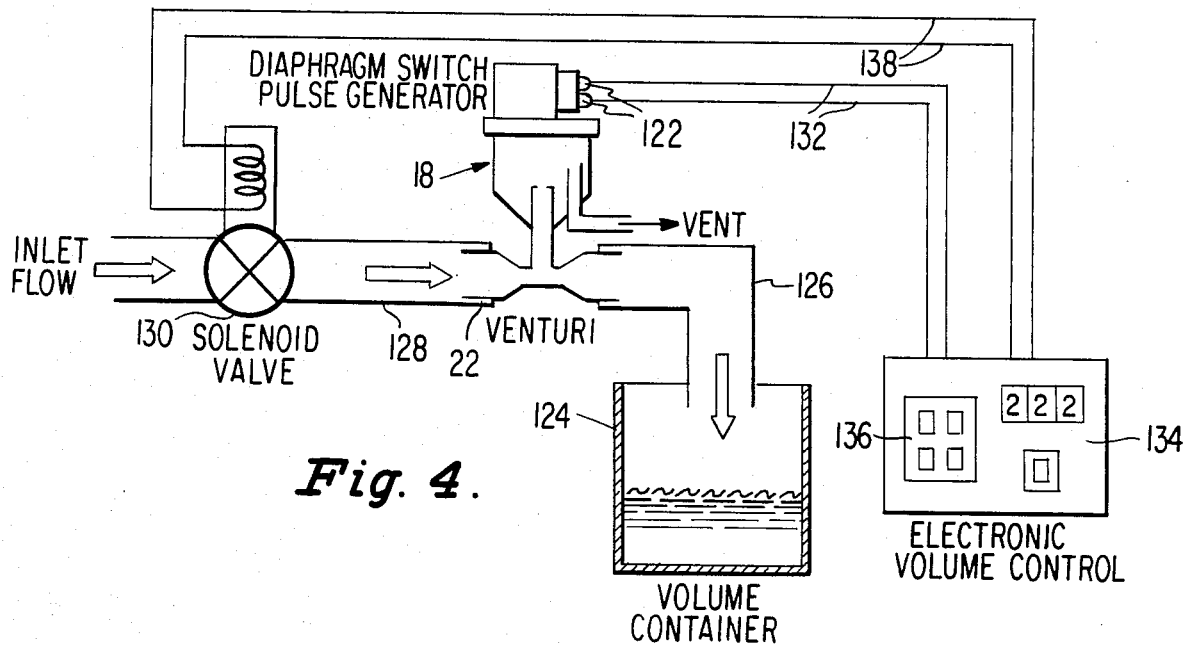
FIG. 4 is a schematic diagram showing an application of apparatus constructed in accordance with the principles of this invention.

FIG. 4 illustrates in schematic form a system application of the aforedescribed apparatus to fill a container 124 with a desired amount of fluid. Accordingly, the apparatus 18 is connected so that an outlet hose 126 is fitted on the conduit 22 and empties into the container 124. The inlet end of the conduit 22 is connected to an inlet hose 128 which is coupled through a solenoid valve 130 to a source of fluid. The output signal terminals 122 of the apparatus 18 are connected via the leads 132 to an electronic volume control 134. The control 134 has input means 136 whereby an operator can indicate a desired volume fill level for the container 124. The control 136 opens the solenoid valve 130 via the control leads 138 and allows fluid to flow into the container 124. The control 134 then responds to the pulse signals over the leads 132 to calculate the instantaneous flow rate and integrates this flow rate with respect to time to determine the amount of fluid entering the container 124. When this equals the desired volume, the control 134 causes the solenoid valve 130 to shut off the fluid flow.

Accordingly, there has been disclosed apparatus for providing a signal related to the rate of flow of fluid through a conduit. It is understood that the above-described embodiment is merely illustrative of the application of the principles of this invention. Numerous other embodiments may be devised by those skilled in the art without departing from the spirit and scope of this invention, as defined by the appended claims.

We claim:

1. Apparatus for providing a digital signal related to the rate of flow of a fluid through a conduit comprising:
   means for providing a restriction in said conduit;
   a housing having a chamber formed therein;
   a diaphragm sealing said chamber;
   an open passageway through said housing between said chamber and the exterior of said housing;
   means for controlling the flow rate through said passageway
   means for providing communication between said chamber and said conduit in the vicinity of said restriction;
   a valve seat supported on said housing at the entrance of said communication means into said chamber;
   a valve seat seal coupled to move with said diaphragm toward and away from sealing engagement with said valve seat;
   means for biasing said valve seat seal away from said valve seat; and
   switching means coupled to said diaphragm for providing said digital signal.

2. The apparatus according to claim 1 wherein said restriction providing means includes a tapered orifice member fixed within said conduit.

3. The apparatus according to claim 1 wherein said switching means includes an optical interrupter assembly positioned outside said chamber.

4. The apparatus according to claim 1 further including a lost motion connection coupling said valve seat seal to said diaphragm.

5. The apparatus according to claim 4 wherein said lost motion connection includes:
   an actuator rod extending through said diaphragm into said chamber, said actuator rod being formed with an enlarged shoulder portion preventing said actuator rod from exiting said chamber;
   a retainer member slidably mounted on said actuator rod inside said chamber;
   a spring surrounding said actuator rod on the opposite side of said retainer member from said diaphragm;
   a retaining ring secured to the end of said actuator rod inside said chamber to capture said spring between said retainer member and said retaining ring;
   a plunger secured to said retainer member and extending into said chamber away from said diaphragm and toward said valve seat; and
   means for mounting said valve seat seal on said plunger.

6. The apparatus according to claim 5 further including means for guiding said plunger to travel linearly toward and away from said valve seat.

7. The apparatus according to claim 6 wherein said switching means includes:
   a source of radiant energy;
   means for detecting said radiant energy and providing a signal in response thereto; and
   interrupting means coupled to said actuator rod for blocking said radiant energy from reaching said detecting means for a range of positions of said actuator rod.

8. The apparatus according to claim 1 wherein said housing and said conduit are formed as an integrally molded unit and said communication means is formed as a passage in said unit between said chamber and said conduit, and said means for providing a restriction comprises a tapered orifice member positioned in said conduit to provide an annular chamber where said passage enters said conduit.

9. The apparatus according to claim 1 wherein said controlling means includes means for restricting flow through said open passageway.

* * * * *